US007267285B2

(12) United States Patent
Berson

(10) Patent No.: US 7,267,285 B2
(45) Date of Patent: *Sep. 11, 2007

(54) INFORMATION ENCODING ON SURFACES BY VARYING SPECTRAL EMISSIVITY

(76) Inventor: William Berson, 9 Huckleberry La., Weston, CT (US) 06883

( * ) Notice: Subject to any disclaimer, the term of this patent is extended or adjusted under 35 U.S.C. 154(b) by 0 days.

This patent is subject to a terminal disclaimer.

(21) Appl. No.: 11/387,383

(22) Filed: Mar. 22, 2006

(65) Prior Publication Data

US 2006/0163363 A1 Jul. 27, 2006

Related U.S. Application Data

(63) Continuation of application No. 10/355,670, filed on Feb. 1, 2003, now Pat. No. 7,044,386.

(60) Provisional application No. 60/354,374, filed on Feb. 5, 2002.

(51) Int. Cl.
*G06K 19/06* (2006.01)
(52) U.S. Cl. .................... 235/491; 345/494; 345/454
(58) Field of Classification Search ................ 235/454, 235/494, 491, 468, 469, 462.01, 462.04
See application file for complete search history.

(56) References Cited

U.S. PATENT DOCUMENTS

| 3,239,815 A | 3/1966 | Martens |
| 3,245,697 A | 4/1966 | Nugent |
| 3,455,577 A | 7/1969 | Kikumoto |
| 3,468,046 A | 9/1969 | Makishima |
| 3,477,156 A | 11/1969 | Naito |
| 3,536,894 A | 10/1970 | Travioli |
| 3,621,249 A | 11/1971 | Kikumoto |
| 3,640,009 A | 2/1972 | Komiyama |

(Continued)

FOREIGN PATENT DOCUMENTS

JP          9-161002        6/1997

OTHER PUBLICATIONS

Chavez, Cesar, "Application Note Radiometric Temperature: Concepts and Solutions," Santa Barbara Infrared, Inc., 30 South Calle, Suite D, Santa Barbara, CA, www.SBIR.com, No date available.

(Continued)

*Primary Examiner*—Jared J. Fureman
(74) *Attorney, Agent, or Firm*—Fish & Neave IP Group of Ropes & Gray LLP

(57) ABSTRACT

A method for applying surface modifications in at least two patterns that differ in spectral emissivity by known amounts. The patterns form an information-encoding sequence of transitions of differential emissivity along a scan path over the patterns, that encodes a set of information. This information is decoded by a scanner sensitive to emissivity in the given portion of the electromagnetic spectrum, and sensitive to transitions in emissivity of the known amounts, when scanned along the scan path, combined with knowledge of the expected emissivity values of the patterns. This provides secure informational marking of articles and documents, including mail. The patterns may be visible, or hidden, but the emissivity values are not duplicated by standard office equipment, so authenticity of the patterns can be determined using the special emissivity scanner.

19 Claims, 2 Drawing Sheets

U.S. PATENT DOCUMENTS

| | | | | |
|---|---|---|---|---|
| 3,802,101 | A | 4/1974 | Scantlin | |
| 3,829,662 | A | 8/1974 | Furahashi | |
| 3,891,829 | A * | 6/1975 | Dobras | 235/462.04 |
| 3,918,029 | A * | 11/1975 | Lemelson | 235/468 |
| 3,919,447 | A | 11/1975 | Kilmer, Jr. et al. | |
| 4,044,231 | A | 8/1977 | Beck et al. | |
| 4,210,916 | A | 7/1980 | Mansukhani | |
| 4,264,366 | A | 4/1981 | Peng | |
| 4,312,915 | A | 1/1982 | Fan | |
| 4,359,633 | A | 11/1982 | Bianco | |
| 4,417,822 | A | 11/1983 | Stein et al. | |
| 4,521,861 | A | 6/1985 | Logan et al. | |
| 4,529,633 | A | 7/1985 | Karlsson | |
| 4,530,961 | A | 7/1985 | Nguyen et al. | |
| 4,625,101 | A * | 11/1986 | Hinks et al. | 235/462.01 |
| 4,627,819 | A * | 12/1986 | Burrows | 235/462.01 |
| 4,647,774 | A | 3/1987 | Brisk et al. | |
| 4,647,775 | A | 3/1987 | Stein | |
| 4,708,493 | A | 11/1987 | Stein | |
| 4,840,496 | A | 6/1989 | Elleman et al. | |
| 4,840,674 | A | 6/1989 | Schwarz | |
| 4,888,475 | A | 12/1989 | Mullenmeister | |
| 4,889,367 | A | 12/1989 | Miller | |
| 4,910,185 | A | 3/1990 | Satake et al. | |
| 4,919,542 | A | 4/1990 | Nulman et al. | |
| 5,155,080 | A | 10/1992 | Elder et al. | |
| 5,166,080 | A | 11/1992 | Schietinger et al. | |
| 5,184,148 | A | 2/1993 | Suga et al. | |
| 5,259,907 | A * | 11/1993 | Soules et al. | 156/277 |
| 5,281,261 | A | 1/1994 | Lin | |
| 5,282,017 | A | 1/1994 | Kasindorf et al. | |
| 5,294,198 | A | 3/1994 | Schlagheck | |
| 5,296,887 | A | 3/1994 | Zander | |
| 5,308,161 | A | 5/1994 | Stein | |
| 5,315,098 | A | 5/1994 | Tow | |
| 5,401,960 | A | 3/1995 | Fisun et al. | |
| 5,460,451 | A | 10/1995 | Wadman | |
| 5,568,177 | A | 10/1996 | Talvalkar et al. | |
| 5,571,311 | A | 11/1996 | Belmont et al. | |
| 5,582,103 | A | 12/1996 | Tanaka et al. | |
| 5,597,237 | A | 1/1997 | Stein | |
| 5,597,997 | A | 1/1997 | Obata et al. | |
| 5,648,650 | A | 7/1997 | Sugifune et al. | |
| 5,653,844 | A | 8/1997 | Abrams | |
| 5,686,725 | A | 11/1997 | Maruyama et al. | |
| 5,701,538 | A | 12/1997 | Yasui | |
| 5,704,712 | A | 1/1998 | Stein | |
| 5,709,918 | A | 1/1998 | Kimijima et al. | |
| 5,814,806 | A | 9/1998 | Tanaka et al. | |
| 5,861,618 | A | 1/1999 | Berson | |
| 5,906,678 | A | 5/1999 | Fujiyama et al. | |
| 5,908,527 | A | 6/1999 | Abrams | |
| 5,963,662 | A | 10/1999 | Vachtsevanos et al. | |
| 5,971,276 | A * | 10/1999 | Sano et al. | 235/462.01 |
| 5,981,040 | A | 11/1999 | Rich et al. | |
| 6,001,510 | A | 12/1999 | Meng et al. | |
| 6,025,926 | A | 2/2000 | Smith et al. | |
| 6,039,257 | A | 3/2000 | Berson et al. | |
| 6,069,190 | A | 5/2000 | Bates et al. | |
| 6,095,682 | A | 8/2000 | Hollander et al. | |
| 6,123,263 | A | 9/2000 | Feng | |
| 6,168,081 | B1 | 1/2001 | Urano et al. | |
| 6,191,851 | B1 | 2/2001 | Kirkham et al. | |
| 6,203,069 | B1 | 3/2001 | Outwater et al. | |
| 6,255,948 | B1 | 7/2001 | Wolpert et al. | |
| 6,274,873 | B1 | 8/2001 | Outwater et al. | |
| 6,280,069 | B1 | 8/2001 | Pastrick et al. | |
| 6,299,346 | B1 | 10/2001 | Shalom et al. | |
| 6,309,690 | B1 | 10/2001 | Brogger et al. | |
| 6,352,751 | B1 | 3/2002 | Miles et al. | |
| 6,354,501 | B1 | 3/2002 | Outwater et al. | |
| 6,355,598 | B1 | 3/2002 | Takeda et al. | |
| 6,543,808 | B1 | 4/2003 | Mitchell et al. | |
| 6,561,422 | B1 | 5/2003 | Cariffe | |
| 6,576,155 | B1 * | 6/2003 | Barbera-Guillem | 252/301.36 |
| 6,610,351 | B2 | 8/2003 | Shchegolikhin et al. | |
| 6,612,494 | B1 | 9/2003 | Outwater | |
| 6,669,093 | B1 | 12/2003 | Meyerson et al. | |
| 6,793,138 | B2 * | 9/2004 | Saito | 235/454 |
| 6,874,639 | B2 * | 4/2005 | Lawandy | 235/491 |
| 7,038,276 | B2 * | 5/2006 | Ker et al. | 257/343 |
| 7,038,766 | B2 * | 5/2006 | Kerns et al. | 356/71 |
| 7,044,386 | B2 * | 5/2006 | Berson | 235/491 |
| 7,079,230 | B1 * | 7/2006 | McInerney et al. | 356/71 |
| 2002/0054201 | A1 | 5/2002 | Takeda et al. | |
| 2002/0056756 | A1 * | 5/2002 | Cameron et al. | 235/468 |

OTHER PUBLICATIONS

Fraser III, John A., "The use of Encrypted, Coded and Secret Communications is an Ancient Liberty Protected by the United States Constitution," Virginia Journal of Law and Technology, University of Virginia, vol. 2, Fall 1997, No month avaliable.

Roeser and Weasel, "Handbook of Chemistry and Physics," Chemical Rubber Company, 49th Edition, 1968, pp. E-228 and F-76, No month available.

Shulman, David, "An Annotated Bibliography of Cryptography," pp. 6-13, No date available.

"Thermoelectric Module System Design," INB Products, Inc., http://www.inbthermoelectric.com/thermo.html, Erwin St. Van Nuys, CA, 91411, (printed Jul. 12, 2004), p. 1.

"Thermoelectric Module System Design," INB Products, Inc., http://www.inbthermoelectric.com/design.html, Erwin St. Van Nuys, CA, 91411, (printed Jul. 12, 2004), pp. 1-3.

"Thermopile Module Low Cost Non Contact Temperature Measurement Technical Data," (Webpage), www.bnbopto.co.kr/ sensors/tps/techincaldata1.htm, (printed Oct. 6, 2004), pp. 1-9.

"Understanding Thermopile Infrared Sensors" (Webpage), B+B Corporation South Korea, copyright 2000, www.bnbopto.co.kr/ sensors/typs/typs_infor.htm (printed Jul. 12, 2004), pp. 1-5.

Wilkens, John, "Mercury, or the Secret and Swift Messenger," Chapter V, pp. 37-41, No date available.

\* cited by examiner

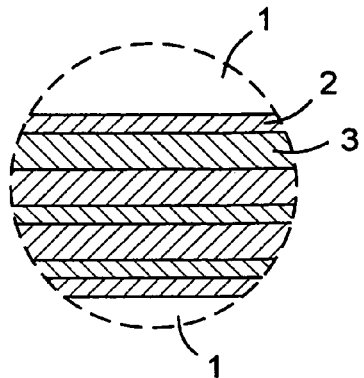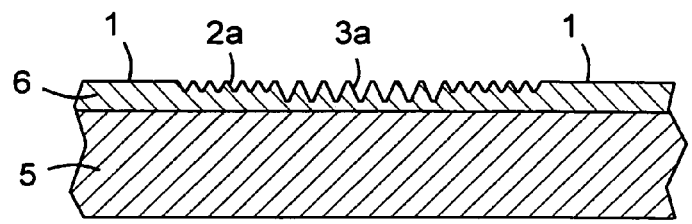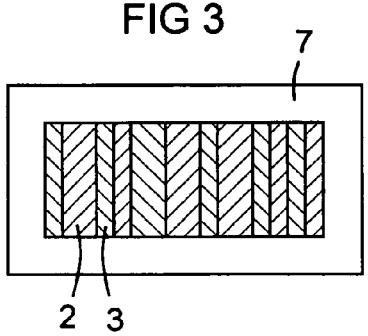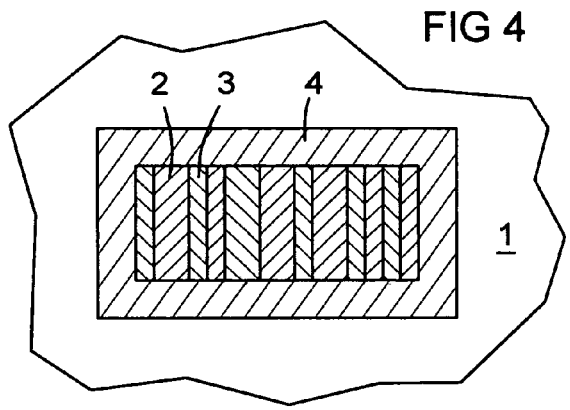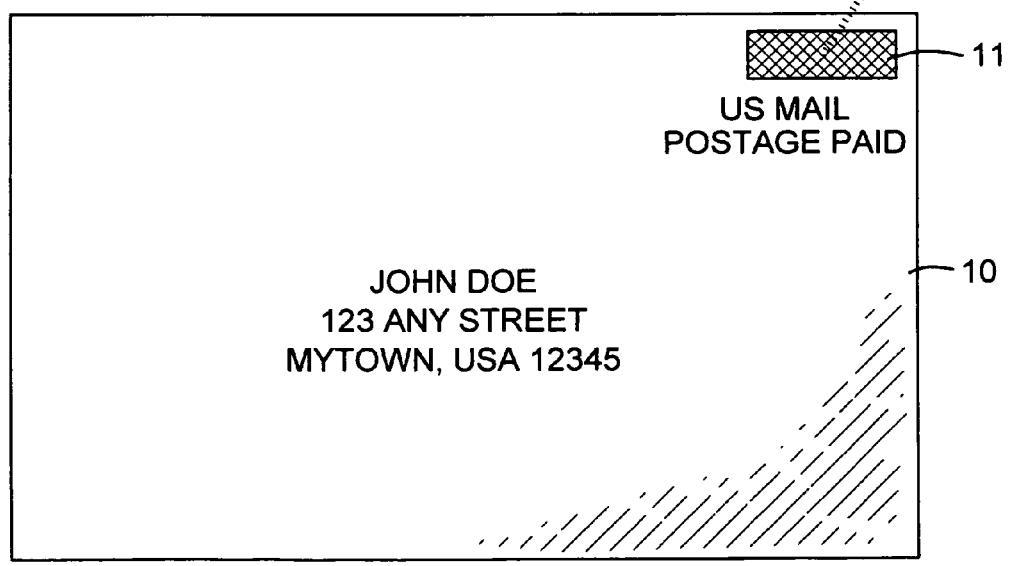

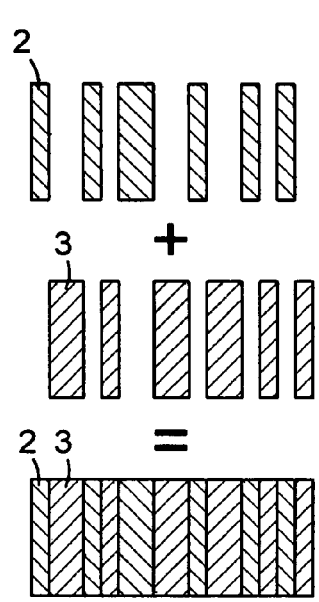
FIG 6
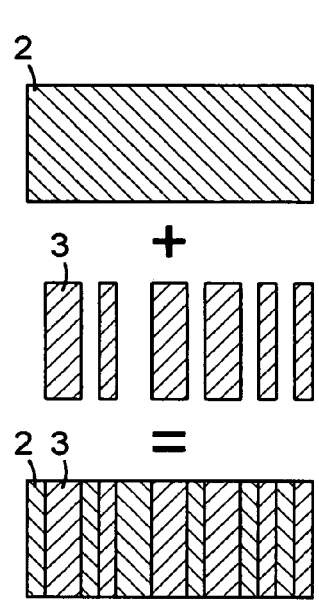
FIG 7
FIG 8
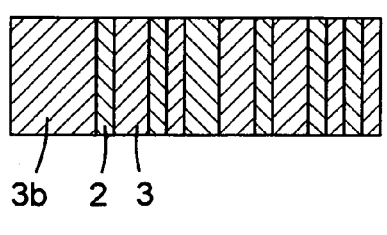
FIG 9
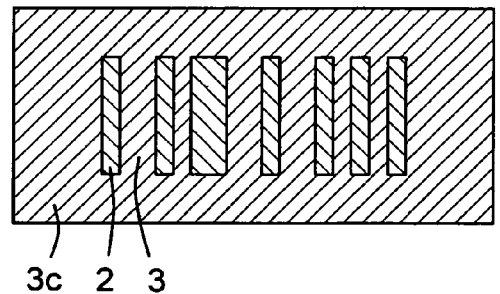

INFORMATION ENCODING ON SURFACES BY VARYING SPECTRAL EMISSIVITY

CROSS-REFERENCE TO RELATED APPLICATIONS

This patent application is a continuation of U.S. patent application Ser. No. 10/355,670, filed Feb. 1, 2003, now U.S. Pat. No. 7,044,386, which claims the benefit of provisional patent application Ser. No. 60/354,374, filed Feb. 5, 2002, which are hereby incorporated by reference in their entireties.

BACKGROUND OF THE INVENTION

1. Field of the Invention

This invention relates generally to the field of steganography.

2. Description of Prior Art

The art and technology of steganography or secret writing/printing has been practiced from antiquity to the present day. Secret communication methods were widely used in Seventeenth Century England and earlier. In *An Annotated Bibliography of Cryptography*, David Shulman lists a number of treatises on cryptographic subjects published in England between 1593 and 1776, as well as scholarly books that contained chapters on use of codes, ciphers, and secret writing techniques. One such work, John Wilkins' *Mercury, or the Secret and Swift Messenger*, describes the use of . . . secret inks and papers. Another source describing the antiquity of various means of secret writing and invisible printing is *The use of Encrypted, coded and Secret Communications is an Ancient Liberty Protected by the United States Constitution*. By John A. Fraser Ill., Virginia Journal of Law and Technology, U. of Virginia, Fall 1997 volume 2.

Various ingenious means such as 'invisible inks' have been developed to create a hidden mark or message. These hidden marks have been used to conceal messages and to counter the efforts of counterfeiters. In modern times, the art of hidden marks has been extended to the use of bar codes and other information-rich symbols containing variable information. Simple marking has obvious requirements for durability and readability, but in bar-coding and other advanced symbologies, it is desirable to have a means to obscure or hide a mark and make it uncopyable by computer printers.

The prior art consists of embossing and printing bar codes and other information-rich symbols. Bar codes have been used for the identification of documents and products since the early 1950's. Various bar code symbologies have been developed and commercialized, while the technology of scanning and printing has continuously evolved. Numerous developments have been proposed, patented and commercialized, to improve the readability, security and information content of printed codes, including the use of color, encryption, two-dimensional codes, special inks and error correction. Bar-coding is inherently inexpensive to apply because it is printing.

Because it is printing, bar-coding uses ink. All inks are readable through the interaction of the ink with radiation or an electromagnetic field. Visible inks absorb light in the visible spectrum and are thereby readable. Fluorescing or phosphorescing inks are excited by radiation of a particular wavelength and the light emitted is then detectable. Magnetic inks as used in document coding, are detected through their perturbation of a magnetic field. The prior art of printing has made use of various physical properties of inks such as reflectance, absorption, transmission, fluorescence, and color. No printing, especially that of machine-readable symbology has made use of the intrinsic emissivity of materials.

The deficiency in the prior technology is that it is not secure against copying on conventional computer printers and can be read, duplicated, and printed by unauthorized parties. Even fluorescent inks, holograms, and magnetic strips are susceptible to counterfeiting, alteration, and copying.

PRIOR ART REFERENCES

U.S. Pat. No. 4,529,633, Carlsoa, Thermal Camouflage
U.S. Pat. No. 4,647,774, Brisk et al., Pyrometer #2
U.S. Pat. No. 4,647,775, Stein, Pyrometer 1
U.S. Pat. No. 4,708,493, Stein, Apparatus for remote measurement of temperatures
U.S. Pat. No. 4,840,496, Elleman et al., Noncontact Temperature Pattern Measuring Device
U.S. Pat. No. 5,155,080, Schietinger et al., Techniques for measuring the thickness of a film formed on a substrate
U.S. Pat. No. 5,282,017, Kasindorf et al., Reflectance Probe
U.S. Pat. No. 5,294,198, Schlagheck, Infrared inspection system and method employing emissivity indications
U.S. Pat. No. 5,296,887, Zander, Bar-coded film spool
U.S. Pat. No. 5,308,161, Stein, Pyrometer apparatus for use in rapid thermal processing of semiconductor wafers
U.S. Pat. No. 5,582,103, Tanaka et al., Method of making an anti-counterfeit latent image formation object for bills, credit cards, etc.
U.S. Pat. No. 5,597,237, Stein, Apparatus for measuring the emissivity of a semiconductor wafer
U.S. Pat. No. 5,597,997, Obata et al., Optical Information Reader
U.S. Pat. No. 5,648,650, Sugifune et al., Optical Barcode reading apparatus with regular reflection detecting circuit
U.S. Pat. No. 5,701,538, Yasui, Photographic film cassette and production method therefore
U.S. Pat. No. 5,704,712, Stein, Method for remotely measuring temperatures which utilizes a two wavelength radiometer and a computer
U.S. Pat. No. 5,709,918, Kimijima et al., Information indicator and information indicating labels
U.S. Pat. No. 6,001,510, Meng et al., Method for producing laser hologram anti-counterfeit mark with identifying card and inspecting card and inspecting apparatus for the mark

INK REFERENCES

U.S. Pat. No. 4,210,916, Mansukhani, Ink jet inks
U.S. Pat. No. 4,264,366, Peng, Cancellation and marking inks
U.S. Pat. No. 4,840,674, Schwarz, Ink compositions
U.S. Pat. No. 5,571,311, Belmont et al., Ink Jet ink formulations containing carbon black products
U.S. Pat. No. 5,906,678, Fujiyama et al., Hot melt colored ink
U.S. Pat. No. 6,069,190, Bates et al., Ink compositions having improved latency

SUMMARY OF THE INVENTION

A primary object of the invention is to create, apply, and decode a machine-readable symbol, code, writing, or legend by means of differential emissivity. Another object of the invention is to create an invisible bar code. Another object of the invention is to create an anti-counterfeiting mark that cannot be replicated by a computer printer. Another object of the invention is to securely identify articles. Another object of the invention is to securely identify documents. Another object of the invention is to prevent the counterfeiting of documents. Another object of the invention is to imbed machine-readable information in a secure mark. Another object of the invention is to provide a means to read a machine-readable mark by means of differential emissivity. Another object of the invention is to enhance the information content of printed marks, symbols and code.

These objective are achieved by applying surface modifications in at least two patterns that differ in spectral emissivity by known amounts as measured in a given portion of the electromagnetic spectrum that includes at least a part of the invisible spectrum. The patterns form an information-encoding sequence of transitions of differential emissivity along a scan path over the patterns, that encodes a set of information. This information is decoded by a scanner sensitive to emissivity in the given portion of the electromagnetic spectrum, and sensitive to transitions in emissivity of the known amounts, when scanned along the scan path, combined with knowledge of the expected emissivity values of the patterns. This provides secure informational marking of articles and documents, including mail. The patterns may be visible or hidden, but the emissivity values are not duplicated by standard office equipment, so authenticity of the patterns can be determined using the special emissivity scanner.

Other objects and advantages of the invention will become apparent from the following description and drawings, which disclose the invention, and illustrate examples of it.

BRIEF DESCRIPTIONS OF THE DRAWINGS

The drawings are part of this specification and illustrate examples of the invention, which may be embodied in various forms. Some aspects of the invention may be shown enlarged and/or exaggerated to facilitate an understanding of the invention.

FIG. 1 is an illustration of a portion of a surface with a pattern of modifications having varying spectral emissivity.

FIG. 2 is a sectional view of part of a surface with areas of varying spectral emissivity created by varying surface texture or roughness.

FIG. 3 illustrates an adhesive label having a surface with information encoded as bar codes using two surface modifications with emissivities that differ from each other and from that of the surface.

FIG. 4 illustrates a portion of a surface with information encoded as bar codes using two types of surface modifications for the bars, plus a third type of surface modification that provides a border around the other bars.

FIG. 5 illustrates an emissivity scanning process.

FIG. 6 illustrates the application of two complementary patterns.

FIG. 7 illustrates the application of a first ink over the pattern area, then a second ink in a pattern on top of the first ink, resulting in the same emissivity transitions as in FIG. 6.

FIG. 8 illustrates two patterns as in FIG. 6 or 7, with an additional area 3b.

FIG. 9 illustrates two patterns and a border 3c using only two modifications.

REFERENCE NUMBERS 1. a surface for marking
2. a first type of surface modification with a known first emissivity value
2a. a first type of roughness applied to a surface to produce an area with a known first emissivity value
3. a second type of surface modification with a known second emissivity value
3a. a second type of roughness applied to a surface to produce an area with a known second emissivity value
3b. a calibration and registration area for the scanner ahead of the emissivity transitions, using the second type of surface modification
3c. a calibration, registration, and search border for the scanner around the emissivity transitions, using the second type of surface modification
4. a third type of surface modification with a known third emissivity value
5. substrate of surface for marking
6. outer layer of substrate
7. Label
10. a mailing envelope
11. encoded information or indicia
12. an emissivity sensing scanner

TERMINOLOGY

Emissivity: The ability of a given surface to emit radiant energy compared to that of a black body at the same temperature and with the same area. Emissivity is a ratio of the energy emitted by the surface of a given material divided by energy emitted by a black body under the same excitation conditions. The measurement of emissivity may be restricted to a given frequency or range of frequencies of emitted energy and/or to a given frequency or frequencies of excitation energy. Emissivity may or may not include a visible component, depending on the radiation measurement frequencies of interest.

Differential Emissivity: The difference in emissivity of two surfaces or materials under the same excitation conditions.

Invisible Electromagnetic Spectrum
    Electromagnetic waves outside the visible wavelengths of about 0.4-0.7 microns.

DETAILED DESCRIPTION

This invention is a method for creating machine-readable codes and marks which are detected and read by means of spectral emissivity, comprising the steps of:
    providing two or more inks having different intrinsic spectral emissivities, or which upon drying leave a surface with controlled surface texture;
    printing a symbol with these inks using conventional printing means, and/or embossing the printed surface with a symbol having varying surface texture or roughness;
    applying the symbol directly to a document or article or affixing it to a label for future application;
    scanning the symbol to detect the areas of differing spectral emissivity;
    decoding the information in the symbol; and
    displaying this information or transferring it to a data processing system.

The codes and marks thus created are useful in marking and labeling documents and products in such a way that the mark cannot be detected by eye, or detected, scanned, and reproduced with standard office copying or scanning equipment, yet they can be detected and decoded using specialized scanners as later described. These codes and marks can be employed to identify objects and documents to determine their authenticity. They may also serve to carry concealed information regarding the origin, application, authorship, history, proper application, intellectual property ownership, derivation, and authenticity of documents and objects.

This invention may be used to deter counterfeiting of documents and objects and to identify genuine articles. An example of such an application is the concealed labeling of expensive designer handbags to determine if they are supplied through legitimate channels. Another example is the hidden coding of driver's licenses to distinguish authentic licenses from counterfeits.

Special inks for this invention are composed of a suitable carrier liquid containing a suspension, solution, or other composition of pigments and other materials of known intrinsic spectral emissivity in either the total electromagnetic spectrum, or in a given portion of the spectrum. Carrier liquids may be based on water or hydrocarbon, including liquids such as alcohol, ethylene glycol, or others as known in the art of ink making. Examples of materials with known emissivity that are readily adapted to conventional printing processes, are elements such as the following:

| Material | Emissivity |
| --- | --- |
| Carbon | 0.80–0.93 |
| Cobalt | 0.36 |
| Copper | 0.10 |
| Gold | 0.14 |
| Manganese | 0.59 |
| Silver | 0.07 |

Source: Roeser and Weasel, National Bureau of Standards, Spectral Emissivity of Materials, Surface Unoxidized for 0.65µ, *Handbook of Chemistry and Physics*, 49$^{th}$ Edition, Chemical Rubber Company 1968, page E-228

An alternate composition of the special inks for this invention are inks that dry or cure with a predetermined surface texture, creating a surface of predetermined emissivity. Examples of such inks are those comprising dense suspensions of colorants, pigments, or other particulate materials such as ferric oxide.

The use of surface texture of ink to control spectral emissivity is based on the principal that: "The emissivity of oxides and oxidized metals depends to a large extent upon the roughness of the surface. In general, higher values of emissivity are obtained on the rougher surfaces . . . ". From the above Handbook of Chemistry and Physics, page E-228. In addition, a surface may be embossed or physically textured before inking, or an ink may be embossed after drying to produce a desired emissivity.

The variable emissivity features described above may be embodied in a label. The substrate material for the label may be paper, a metallic film or foil, plastic, or other material.

Printing may be accomplished through any method, such as offset, ink jet, xerographic, or press. Although the symbol thus created may be visible to the eye and therefore copyable by standard office equipment and scanners, the information contained in the variable emissivity code will not be so readable or copyable. A symbol copied on conventional office equipment may appear similar to the original, but even the bulk presence or absence of the variable emissivity code can serve to determine if a symbol is authentic.

Scanning the symbol can be accomplished by means of a laser spot scanner as used for non-contact emissivity measurements as known in the art. Such instruments can detect emissivity differences on the order of 0.05 at a spatial resolution of 0.1 mm or less as required for bar code reading. Although emissivity measurements and estimates are employed to correct the temperature measurements of very hot objects, spectral emissivity measurements can now be made at room temperature. Scanning is accomplished by means of a scanner, which can detect and measure the emissivity of a particular spot. The preferred embodiment of the scanner is comprised of the following elements: a laser, scanning mirror or prism, mirror/prism deflection motor and controller, photo-detector.

For example, active laser pyrometer technology is disclosed in U.S. Pat. No. 4,417,822 issued on Nov. 29, 1983 to Alexander Stein. Such instruments obtain an accurate temperature measurement by discounting the emissivity of a surface. In U.S. Pat. No. 4,840,496 issued on Jun. 20, 1989, Elleman et al. disclose a narrow laser beam contactless pyrometer, capable of scanning a small area and determining the emissivity and temperature.

FIG. 1 shows a machine-readable mark created of any desired size and shape on a surface 1. The mark contains blank areas of unmarked surface 1 and a pattern of areas of varying emissivity 2, 3. The pattern may be a bar code or other machine readable code, or may contain a human readable character or symbol.

In a preferred embodiment, the pattern is printed on a surface using a black colored carbon-black ink and a black colored inorganic ink. Preferably ink jet printing is used for both inks. The carbon-black ink can be any combination of an aqueous or other vehicle and a carbon black product as known in the art. Examples of such inks are given in U.S. Pat. Nos. 5,184,148, 4,530,961, and 5,281,261. The inorganic ink contains a vehicle and one or more inorganic dyes such as nickel sulfide inorganic dyes. The surface can be a paper of conventional 12 lb. glossy white label stock or any other surface of known emissivity that differs measurably from the emissivities of both inks.

The two inks can be printed in complementary patterns in a single pass, such that the whole area of the mark is covered with one or the other ink as in FIG. 6. In this approach, one pattern is the negative of the other pattern, resulting in a marked area that appears solid black. Alternately, a first ink can be printed over the whole area of the mark, and allowed to dry, then a second ink can be printed in the pattern on top of the first ink as in FIG. 7. With either method, the mark appears solid black in the visible spectrum, but reveals the pattern in a selected invisible range in which the two inks have a known emissivity differential.

Optionally, an enlarged area ahead of the pattern can be applied using one of the inks or other surface modifications as in FIG. 8. This allows a scanner to more easily register and calibrate itself to the surface temperature on a larger area without transitions before scanning the pattern. Optionally, a rectangular or other-shaped border around the pattern can be provided using one of the surface modifications as in FIG. 9. This provides a registration and calibration area in the form of a whole border so that a scanner can more easily automatically search a document or article for a mark that may not be in a standard location. The border can be rectangular so that the front or back end of the pattern can be identified, or it can be trapezoidal or otherwise asymmetric, so that the front end of the pattern can be distinguished from the back end before scanning.

In FIG. 2 an alternate means for creating a machine-readable mark using emissivity as influenced by surface texture is illustrated. In this case, the areas of varying emissivity 2a, 3a have different surface structures. Substrate 5 in the preferred embodiment is a paper envelope. The outermost layer 6 of the substrate has been imprinted to create areas of varying surface roughness 2a and 3a. In a preferred embodiment of this variation, the areas can be created by embossing with an electromechanical dot matrix printer such as the Epson MX-80. This can be done without ink, or with ink formulated to fix and retain the surface texture. Alternatively, raised printing can be created by means of high resolution ink jet printing which can print areas of varying dot density patterns using an ink formulated for raised lettering as known in the art. Optionally, a label with a metallic film surface can be embossed with different textures for this embodiment of the invention.

In FIG. 5, the machine readable mark is illustrated for example as a postage meter indicium, which contains information relating to funds paid for postage, originating address, time and date of sending, etc. The mail piece 10 contains indicium 11, which has been printed as described above. The indicium is scanned for verification, addressing and other purposes by means of a scanner 12.

Although the present invention has been described herein with respect to preferred embodiments, it will be understood that the foregoing description and drawings are intended to be illustrative, not restrictive. Modifications of the present invention will occur to those skilled in the art. All such modifications that fall within the scope of the appended claims are intended to be within the scope and spirit of the present invention.

I claim:

1. A method for encoding information on surfaces, comprising:
   providing a surface that emits energy based on a first intrinsic emissivity value at a given temperature;
   applying to the surface a surface modification that emits energy based on a second intrinsic emissivity value that differs from the first intrinsic emissivity value at the given temperature; and
   arranging the surface modification in at least one pattern that forms an information-encoding sequence of transitions of differential emissivity, wherein the transitions of differential emissivity encode a given set of information regardless of whether any light is present.

2. The method of claim 1 further comprising detecting the transitions of differential emissivity.

3. The method of claim 1 further comprising:
   applying the surface modification to the surface so that the given pattern is not revealed in the visible spectrum, wherein:
   the surface has a given appearance based on light reflection and absorption in the visible spectrum; and
   the surface modification has an appearance based on light reflection and absorption in the visible spectrum that is substantially the same as the given appearance of the surface.

4. The method of claim 1, wherein at least one of the transitions of differential emissivity is at least 0.05.

5. The method of claim 1, wherein the surface modification is an ink.

6. The method of claim 1, wherein the surface modification is a surface texture.

7. The method of claim 1, wherein the surface modification is created by embossing the surface with an electromechanical dot matrix printer.

8. The method of claim 1, wherein the surface modification is created by applying different dot density patterns on the surface by raised printing.

9. The method of claim 1, further comprising:
   scanning the surface for the pattern of transitions of differential emissivity; and
   decoding the transitions of differential emissivity into the given set of information.

10. A system, comprising:
    a surface that emits energy based on a first intrinsic emissivity value at a given temperature;
    a surface modification that is applied to the surface, wherein the surface modification:
    emits energy based on a second intrinsic emissivity value that differs from the first intrinsic emissivity value at the given temperature; and
    is arranged in at least one pattern that forms an information-encoding sequence of transitions of differential emissivity, wherein the transitions of differential emissivity encode a given set of information regardless of whether any light is present.

11. The system of claim 10, wherein:
    the surface has a given appearance based on light reflection and absorption in the visible spectrum;
    the surface modification has an appearance based on light reflection and absorption in the visible spectrum, that is substantially the same as the given appearance of the surface; and
    the pattern does not reveal the given set of information in the visible spectrum.

12. The system of claim 10, wherein at least one of the transitions of differential emissivity is at least 0.05.

13. The system of claim 10, wherein the surface modification is an ink.

14. The system of claim 10, wherein the surface modification is a surface texture.

15. The system of claim 10, wherein the surface modification is created by embossing the surface with an electromechanical dot matrix printer.

16. The system of claim 10, wherein the surface modification is created by applying different dot density patterns on the surface by raised printing.

17. The system of claim 10, further comprising a detector that is sensitive to transitions in intrinsic emissivity.

18. The system of claim 17, wherein the detector scans the surface.

19. The system of claim 10, further comprising a decoder that decodes the emissivity transitions into the given set of information.

* * * * *